US012684323B2

(12) United States Patent (10) Patent No.: US 12,684,323 B2
Eichelberger (45) Date of Patent: Jul. 14, 2026

(54) NEAR-FIELD COMMUNICATION OVERLAY

(71) Applicant: Hewlett-Packard Development Company, L.P., Spring, TX (US)

(72) Inventor: Matheus Eichelberger, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 121 days.

(21) Appl. No.: 18/291,796

(22) PCT Filed: Jul. 30, 2021

(86) PCT No.: PCT/US2021/043872
§ 371 (c)(1),
(2) Date: Jan. 24, 2024

(87) PCT Pub. No.: WO2023/009138
PCT Pub. Date: Feb. 2, 2023

(65) Prior Publication Data
US 2025/0095245 A1 Mar. 20, 2025

(51) Int. Cl.
| | |
|---|---|
| *G06T 11/60* | (2026.01) |
| *G06T 3/40* | (2006.01) |
| *G06T 7/20* | (2017.01) |
| *G06V 20/60* | (2022.01) |
| *H04W 4/80* | (2018.01) |

(52) U.S. Cl.
CPC .............. *G06T 11/60* (2013.01); *G06T 3/40* (2013.01); *G06T 7/20* (2013.01); *G06V 20/60* (2022.01); *H04W 4/80* (2018.02); *G06T 2207/10016* (2013.01)

(58) Field of Classification Search
CPC ... H04W 4/80; G06T 3/40; G06T 7/20; G06T 2207/10016; G06V 20/60
See application file for complete search history.

(56) References Cited

U.S. PATENT DOCUMENTS

| | | | | |
|---|---|---|---|---|
| 10,862,540 | B1 * | 12/2020 | Osborn .................... | H04B 5/73 |
| 11,190,731 | B1 * | 11/2021 | Sculley .............. | G06F 3/04817 |
| 2012/0208458 | A1 | 8/2012 | Iwasaki et al. | |
| 2014/0139347 | A1 * | 5/2014 | Forster ..................... | H04K 3/86 |
| | | | | 340/10.6 |
| 2016/0147414 | A1 * | 5/2016 | Chakravarty ....... | G06F 3/04817 |
| | | | | 715/738 |
| 2017/0046877 | A1 * | 2/2017 | Hustad ................... | G06F 3/011 |
| 2017/0337403 | A1 | 11/2017 | Ohno | |
| 2019/0050867 | A1 * | 2/2019 | Van Os ............ | H04M 1/72445 |
| 2019/0272091 | A1 * | 9/2019 | Seo ........................ | G06F 3/0486 |
| 2020/0279439 | A1 * | 9/2020 | Callaghan .............. | A61M 5/20 |
| 2020/0334429 | A1 | 10/2020 | Singal et al. | |
| 2021/0019735 | A1 | 1/2021 | Hart et al. | |

* cited by examiner

*Primary Examiner* — Terrell M Robinson
(74) *Attorney, Agent, or Firm* — Quarles & Brady LLP

(57) ABSTRACT

In an example implementation according to aspects of the present disclosure, a device, method, and storage medium. The device receives an image and identifies a computing device in the image. The device retrieves a reference diagram of the computing device and overlays a icon over a portion of the computing device in the image corresponding to a location of a near-field communication antenna.

17 Claims, 5 Drawing Sheets

302 — RECEIVE AN IMAGE

300

304 — IDENTIFY A FIRST COMPUTING DEVICE

306 — RETRIEVE A FIRST REFERENCE DIAGRAM

308 — OVERLAY A FIRST ICON A PORTION OF THE FIRST REFERENCE DIAGRAM

310 — RECEIVE A SECOND IMAGE

312 — CALCULATE A MOVEMENT

314 — OVERLAY THE FIRST ICON

NEAR-FIELD COMMUNICATION OVERLAY

BACKGROUND

Computing devices often come equipped with integrated communication components. The communication components allow the computing devices to interact with other nearby computing devices.

DETAILED DESCRIPTION

Computing devices have become more mobile as circuitry decreases in size. As such mobile handheld computing devices have proliferated and are often found in many pockets and bags. Often, a user may have one or more mobile computing devices. A user may desire to transfer files, including pictures or music between two or more of their mobile computing devices. To facilitate this type of peer-to-peer communication near-field communication (NFC) was developed. NFC allows the two devices to detect the presence of each other, and communicate data between themselves, without the need for other underlying network infrastructure. NFC has a very limited range so two devices require close proximity, almost to the point of physical contact, to establish communication.

Described herein is a mobile device including near-field communication overlay. The overlay allows a user, via the display of the mobile device, identify the location of a NFC antenna internal to that device, identify a compatible device in an image from a video stream of the mobile device's camera. The system then overlays on the display of the mobile device, a first icon located at the position of the internal NFC antenna of the mobile device. The system then overlays on the display of the mobile device, a second icon located at the position of the internal NFC antenna of the compatible device. As the user moves the mobile device into proximity of the compatible device, the first icon and second icon overlays are updated relative to their corresponding NFC antenna, allowing the user to visually see the antenna come into proximity.

In one example, a device comprises a memory and a processor communicatively coupled to the memory. The processor executes instructions to receive an image. The processor identifies a first computing device in the image. The processor may retrieve a first reference diagram corresponding to the first computing device. The processor may overlay a first icon over a first portion of the first computing device in the image, corresponding to a first location in the first reference diagram.

Figure 1:
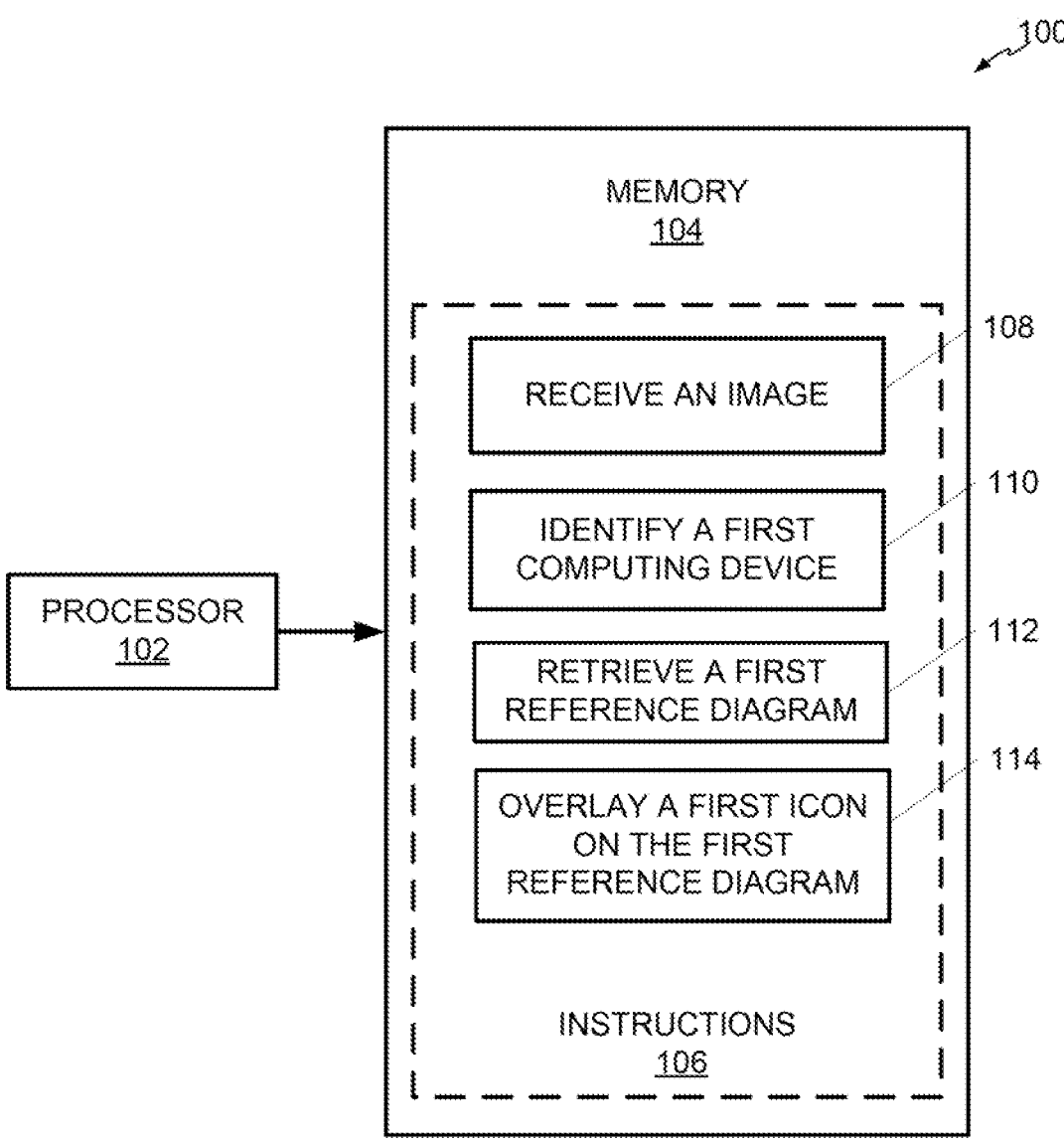
FIG. 1 is a block diagram of a device for supporting a near-field communication overlay, according to an example.

FIG. 1 is a block diagram of a device 100 for supporting a near-field communication overlay, according to an example. The processor 102 of the device 100 may be implemented as dedicated hardware circuitry or a virtualized logical processor. The dedicated hardware circuitry may be implemented as a central processing unit (CPU). A dedicated hardware CPU may be implemented as a single to many-core general purpose processor. A dedicated hardware CPU may also be implemented as a multi-chip solution, where more than one CPU are linked through a bus and schedule processing tasks across the more than one CPU.

A virtualized logical processor may be implemented across a distributed computing environment. A virtualized logical processor may not have a dedicated piece of hardware supporting it. Instead, the virtualized logical processor may have a pool of resources supporting the task for which it was provisioned. In this implementation, the virtualized logical processor may be executed on hardware circuitry; however, the hardware circuitry is not dedicated. The hardware circuitry may be in a shared environment where utilization is time sliced. In some implementations the virtualized logical processor includes a software layer between any executing application and the hardware circuitry to handle any abstraction which also monitors and save the application state. Virtual machines (VMs) may be implementations of virtualized logical processors.

A memory 104 may be implemented in the device 100. The memory 104 may be dedicated hardware circuitry to host instructions for the processor 102 to execute. In another implementation, the memory 104 may be virtualized logical memory. Analogous to the processor 102, dedicated hardware circuitry may be implemented with dynamic random-access memory (DRAM) or other hardware implementations for storing processor instructions. Additionally, the virtualized logical memory may be implemented in a software abstraction which allows the instructions 106 to be executed on a virtualized logical processor, independent of any dedicated hardware implementation.

The device 100 may also include instructions 106. The instructions 106 may be implemented in a platform specific language that the processor 102 may decode and execute. The instructions 106 may be stored in the memory 104 during execution. The instructions 106 may include instructions to receive an image 108. An image may be received by the processor 102 from a coupled digital imaging component or digital camera. In one implementation, a digital camera may be integrated into the device. The digital camera may be a camera on the opposite side of the device from a display, where when active, a user may see on the screen a video stream of what lay on the other side of the display. In some mobile devices, this described arrangement is a front facing camera. The digital camera may be communicatively coupled to the processor 102 by a bus. The image may be one frame within a stream of images constituting a video stream displayed on the device 100 display.

The instructions 106 may include instructions to identify a first computing device in the image 110. The processor 102 may perform a task of object detection on the image. Object detection may be accomplished utilizing computer vision methods. In some implementations, the object detection may be accomplished through a convoluted neural network (CNN). The CNN may be limited to training based on a set of computing devices including NFC antennas for efficiency. The identification of the first computing device may include identifying a make and model of a computing device based on feature detection. In other implementations, the object detection may be accomplished through scale-invariant feature transform. Other object detection machine learning algorithms may be used as well.

The instructions 106 may include instructions to retrieve a first reference diagram of the first computing device 112. The processor 102 may use the output of the object detection from the image and look up a first reference diagram corresponding to the first computing device. The first reference diagram may correspond to a three dimensional (3D) digital rendering of the first computing device. In many implementations, the first reference diagram may comprise a computer aided design (CAD) file. The CAD file may be an object model of the first computing device. The first reference diagram may be stored in an indexed database containing many reference diagrams for popular computing devices. The reference diagrams within the database may include information relating to internal components such as radios and antenna location within the respective computing device.

The instructions 106 may include instructions to overlay a first icon over a first portion of the first computing device in the image corresponding to a first location in the first reference diagram 114. The first icon may be a visual marker that a user of the device can identify as an area where an antenna or radio may be located. The first portion may be a generalized area within the first computing device where the antenna or radio may reside. For example, in a laptop the first portion may include the right-hand rest of the laptop, as the antenna or radio is internal to that portion of the laptop per the first reference diagram.

The processor 102 may generate the overlay by identifying features or edges within the image that correlate to features or edges within the first reference diagram. The processor 102 may calculate a distance from those features or edges to the antenna or radio. The distance may be used to approximate the first location within the first reference diagram. The processor 102 may apply the distance to the computing device within the image via the edges and features. The processor 102 may overlay the first icon onto the image using traditional image manipulation techniques.

The instructions 106 may also include identifying a second computing device receiving the image 116. In most instances, the second device may be the device 100. In this example the identifying may include looking up a hardware identifier within the host operating system of the device. The device 100 may retrieved a second reference diagram of the second computing device. Similar to the retrieval of the first reference diagram, the processor 102 may query a database utilizing an identifier of the second computing device to retrieve a CAD file. The processor 102 may overlay a second icon on a display attached to the second computing device, wherein the second icon corresponds to the location of an antenna associated with the second computing device. In one implementation, the processor 102 may utilize the CAD file to determine an approximate location of the antenna or radio within the second computing device. Based on that approximate location, the processor 102 may place a second icon on the display where the internal antenna or radio of the second computing device may be located. In another implementation, the database may include with the second reference diagram, a constant display location. As the antenna or radio of the second computing device should not move relative to the display, the second icon location may be "hardcoded" to a location on the screen to be overlayed.

The instructions 106 may include receiving a second image. The second image may be a second frame sequentially after the image in a video stream. A movement of the second computing device may also be received with the second image. The movement may correspond to directional data received from an accelerometer or global positioning system from the second computing device. The processor 102 may update the overlay of the first and second icons based on the movement. For example, if the movement corresponds to accelerometer data indicating that the second computing device is rotating (in any direction), the processor may rotate the first and second icons accordingly. As the user tilts the second computing device, the overlay of the first and second icons should reflect the same degree of tilt. The updating the overlay allows the first and second icons to remain visually in the correct plane corresponding to the orientation of both the computing device and the second computing device. Additionally, if the movement corresponds to a movement increasing or decreasing in distance between the first computing device and the second computing device, the first and second icons may be scaled to maintain size relative to their associated computing device within the second image. For example, if the second computing device is approaching the first computing device, the first icon should scale larger as the first computing device scaled in the second image.

The processor 102 may overlay the first and second icons on the second image. The updated overlay may be placed on the device's (100) display reflecting any change from the image to the second image. The processor 102 may compare the relative position of the first and second icons within the image. The processor 102 may determine a threshold size of each of the first and second icon corresponding to proximity. For example, the first icon may be smaller in the image, and after movement, be larger in the second image. Upon the first icon surpassing a size threshold indicating closer proximity to the second computing device, the processor 102 may compare a percentage overlap of the icons. If the percentage overlap meets a threshold, the processor may initiate a wireless data transfer between the first and second computing devices. If the threshold is met, the NFC antenna or radio of the first computing device may be within range of the NFC antenna or radio of the second computing device.

Additionally, the processor 102 may calculate a difference of location from the first icon to the second icon. In one implementation, the difference may be a vector based on the location of the first icon and second icon on the display and a size comparison of the first and second icons. The vector indicates a direction within the image to move from the second icon to the first icon to create an overlap. By comparing the size of the respective icons, a direction toward the first computing device may be inferred. A third icon corresponding to the direction of movement may be overlayed illustrating the direction of movement from the second icon to the first icon. The third icon may be a directional indicator such as an arrow.

Figure 2A:
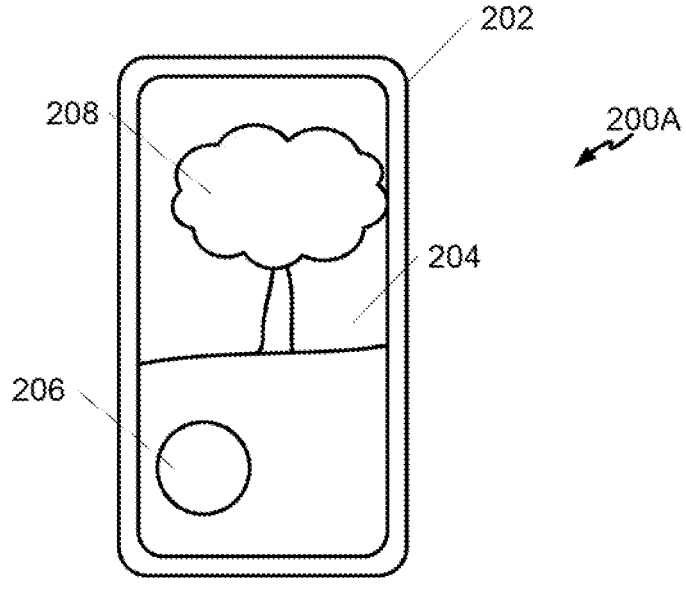
FIG. 2A is an illustration of a computing device with a near-field communication overlay, according to another example.

FIG. 2A is an illustration 200A of a computing device with a near-field communication overlay, according to another example. FIG. 2A corresponds to the device 100 of FIG. 1. References to FIG. 1 may be utilized to describe the illustration. Likewise, in many implementations, the device 100 and the second computing device, as previously described, may be synonymous. In this illustration 200A, the device 100 is illustrated as a mobile phone 202. In other implementations, the device 100 may be implemented as a laptop with a front facing camera, or a tablet with a front facing camera. The mobile phone 202 includes a display 204. The display 204 may present images captured from a front facing camera on the opposite side of the mobile phone 202 from the display 204. In many implementations the display 204 may present a sequence of images from the camera in rapid succession as a video stream.

The subject 208 of the image provides the input to a computer vision object detection algorithm. A trained convoluted neural network may be utilized to process the input. As described previously, the second icon 206 may be overlayed on the image presented on the display 204. In this example, the second icon 206 is illustrated with a dot, corresponding to the location of the NFC radio or antenna incorporated into the mobile phone 202. As the NFC radio or antenna do not move with respect to the mobile phone 202, it is expected that the second icon overlay may not move either.

Figure 2B:
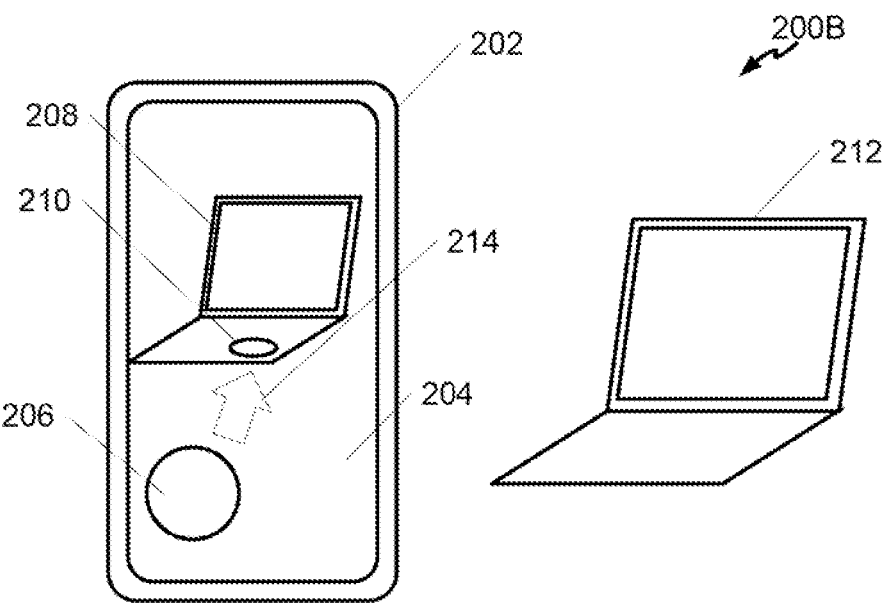
FIGS. 2B, 2C, and 2D are illustrations of a computing device with a near-field communication overlay interacting with another computing device, according to an example.
Figure 2C:
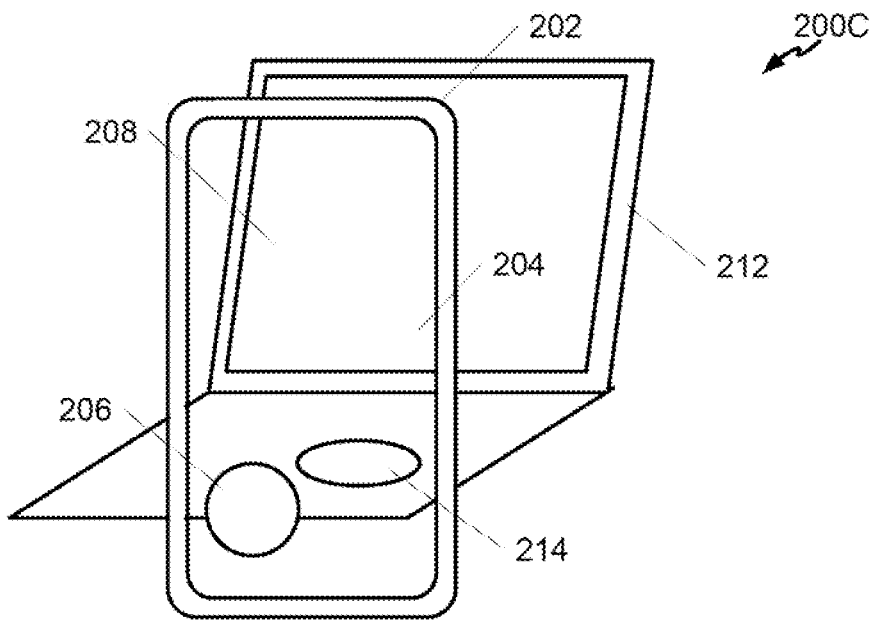
Figure 2D:
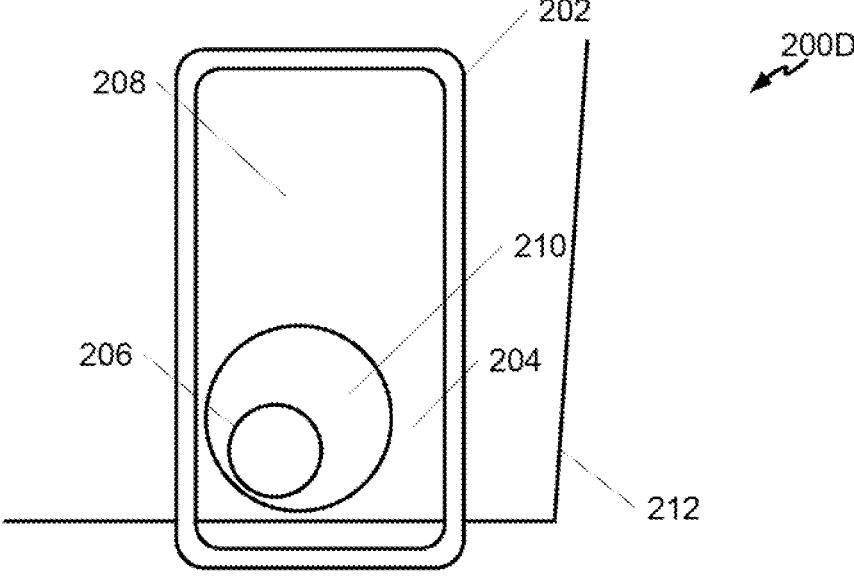

FIGS. 2B, 2C, and 2D are illustrations 200B, 200C, 200D of a computing device with a near-field communication overlay interacting with another computing device, according to an example. Continuing from the mobile phone 202 of FIG. 2A, in FIG. 2B, the subject 208 corresponds to the first computing device illustrated as a laptop 212. The laptop 212 includes an internal NFC radio and antenna. The subject 208 may be identified by a make and model using the computer vision object detection previously described. The laptop 212 make and model may be queried from a database, and the first reference diagram provides the location of the NFC radio and antenna. The mobile phone 202 overlays the first icon 210 in the location corresponding to the image of the laptop.

A third icon 214 may be overlayed on the display 204. The third icon 214 may provide a directional indication for the user of the mobile phone 202. As the second icon 206 does not move on the display 204, the third icon 214 should provide a directional indication from the second icon 206. The directional indication should represent a movement of the user toward the subject 208, in this example, the laptop 212.

In FIG. 2C, the mobile phone 202 has become more proximate to the laptop 212, to the point that the subject 208 is not fully visible in the display 204. The first icon 214 may be scaled larger as the mobile phone 202 physically moves closer to the laptop 212. In this implementation, as the first icon scales larger, and the second icon converges on the first icon's location, the third icon 214 may be omitted for clarity of the display 204

In FIG. 2D, the processor 102 of the mobile phone 202 receives movement data indicating a change in orientation. The illustration 200D shows the mobile phone 202 almost parallel with the hand rest of the laptop 212. The movement data indicates a rotation to a more bird's eye view of the hand rest. As such, the first icon 210 has been skewed accordingly to maintain the perspective within the image on the display 204. Additionally, the first icon 210 has been scaled up as the mobile phone 202 has come closer to the laptop 212. At this point, the convergence of the second icon and the first icon may be verified against a threshold percentage of overlap. The threshold may be determined based on the strength of the NFC antenna or radio. The strength may be included in their respective reference diagrams within the database. If the overlap surpasses the threshold, NFC transfer may be initiated.

Figure 3:
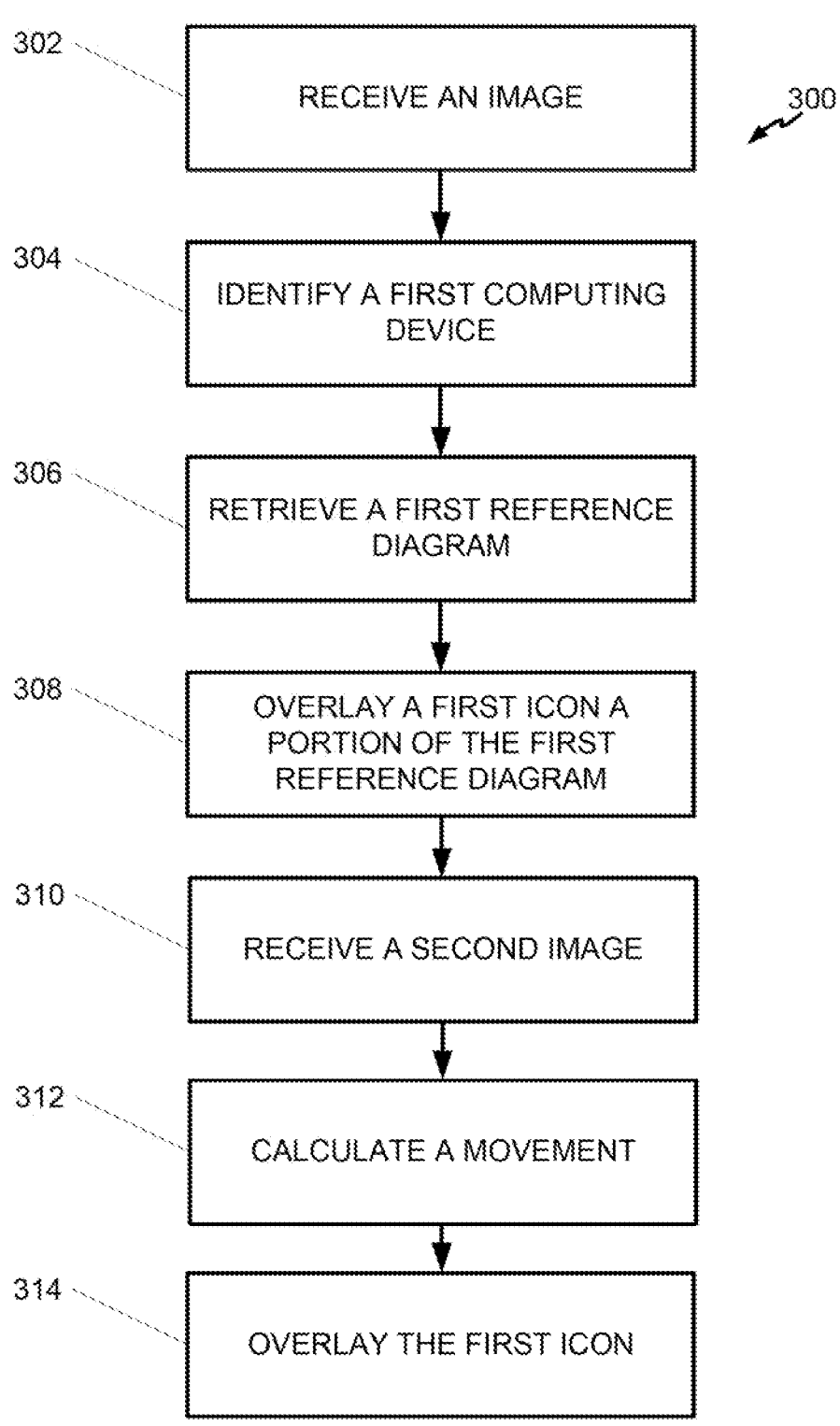
FIG. 3 illustrates a method for creating a near-field communication overlay according to an example.

FIG. 3 illustrates a method 300 for creating a near-field communication overlay according to an example. The method described in reference to FIG. 3 may incorporate some of the logic found in the instructions 106 of the device 100 of FIG. 1. The description of the logic in the instructions 106 may also be applicable to the method 300.

At block 302, the processor 102 receives an image. As described above in relation to FIG. 1 the processor 102 may receive an image as part of a video stream from a live feed of a digital camera. As described above, the image may be transmitted to the processor 102 across a bus.

At block 304, the processor 102 identifies a first computing device in the image. The processor 102 may utilize a computer vision object detection algorithm to detect features corresponding to the first computing devices. At block 306, the processor 102 retrieves a first reference diagram of the first computing device. The first reference diagram may incorporate the CAD file, object model, NFC antenna location, and make and model of the first computing device. The object model may be an additional computer readable model more suited to rendering in a three-dimensional (3D) application.

At block 308, the processor 102 overlays a first icon over a first portion of the first computing device in the image corresponding to the first location in the first reference diagram wherein the first location corresponds to an NFC antenna location within the first computing device. The processor 101 may utilize computer edge detection and render a transparent version of the first computing device within the image. The transparent version may be generated utilizing the object model aligned with the edge detection of the computer vision object detection algorithm. The transparent version may be textured with the first icon over the first portion of the first computing device to maintain perspective, scale and skew of the first icon.

At block 310, the processor 102 receives a second image, wherein the second image sequentially follows the image. The second image may be the next or a subsequent frame in the same video stream that the image belongs.

At block 312, the processor 102 calculates a movement based on a difference between the image and the second image. The movement may correspond to an increase in scale of the first computing device from the image to the second image. The processor 102 may scale the first icon proportionally to the increase in scale of the first computing device in the image. The processor 102 may utilize the computer vision object detection algorithm to adjust the transparent rendering in concordance with the respective position of the first computing device in the second image. The movement may be determined based on a difference in the movement of points within the object model in a 3D space. A resultant 3D vector may be utilized for the calculated movement.

At block 314, the processor 102 overlays the first icon over a first portion of the first computing device in the second image wherein the first portion corresponds to a second location based on the movement between the image and the second image. The first icon may be translated within the 3D space with the interpolated movement of the 3D object. As the object model moves, the first icon (as a texture) moves from the first location in the image to a second location within the second image.

Figure 4:
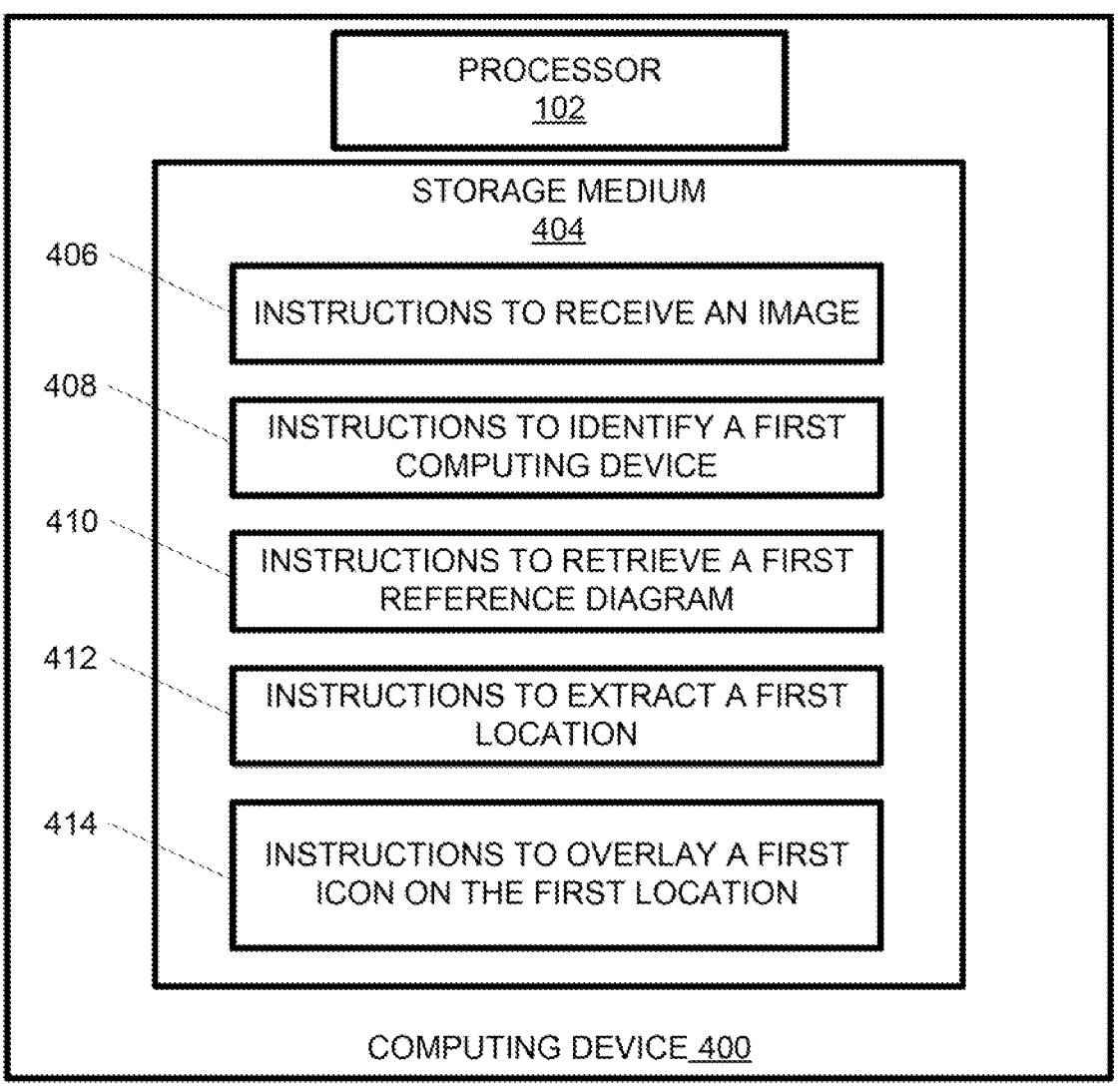
FIG. 4 is a computing device for supporting instructions for a near-field communication overlay, according to an example.

FIG. 4 is a computing device for supporting instructions for a near-field communication overlay, according to an example. The computing device 400 depicts a processor 102 and a storage medium 404 and, as an example of the computing device 400 performing its operations, the storage medium 404 may include instructions 406-414 that are executable by the processor 102. The processor 102 may be synonymous with the processor 102 referenced in FIG. 1. Additionally, the processor 102 may include but is not limited to central processing units (CPUs). The storage medium 404 can be said to store program instructions that, when executed by processor 102, implement the components of the computing device 400.

The executable program instructions stored in the storage medium 404 include, as an example, instructions to receive an image from a digital imaging component 406, instructions to identify a first computing device in the image 408, instructions to retrieve a first reference diagram of the first computing device from a database 410, instructions to extract a first location from the first reference diagram 412, and instructions to overlay a first icon over a first portion of the first computing device in the image corresponding to the first location, wherein the first portion corresponds to an area within the first computing device where a near-field communication antenna is integrated 414.

Storage medium 404 represents generally any number of memory components capable of storing instructions that can be executed by processor 102. Storage medium 404 is non-transitory in the sense that it does not encompass a transitory signal but instead is made up of at least one memory component configured to store the relevant instructions. As a result, the storage medium 404 may be a non-transitory computer-readable storage medium. Storage medium 404 may be implemented in a single device or distributed across devices. Likewise, processor 102 represents any number of processors capable of executing instructions stored by storage medium 404. Processor 102 may be integrated in a single device or distributed across devices. Further, storage medium 404 may be fully or partially integrated in the same device as processor 102, or it may be separate but accessible to that computing device 400 and the processor 102.

In one example, the program instructions 406-414 may be part of an installation package that, when installed, can be executed by processor 102 to implement the components of the computing device 400. In this case, storage medium 404 may be a portable medium such as a CD, DVD, or flash drive, or a memory maintained by a server from which the installation package can be downloaded and installed. In another example, the program instructions may be part of an application or applications already installed. Here, storage medium 404 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A computing device comprising:
   a memory,
   a processor, communicatively coupled to the memory, wherein the processor executes instructions to:
   receive an image of a live feed of a camera;
   identify a first computing device in the image;
   retrieve a first reference diagram of the first computing device;
   overlay a first icon over a first portion of the first computing device in the live feed corresponding to a first location of a near-field communication (NFC) device in the first reference diagram;
   receive a second image, wherein the second image sequentially follows the image in the live feed;
   calculate a movement based on a difference between the image and the second image; and
   overlay the first icon over the first portion of the first computing device in the live feed wherein the first portion corresponds to a second location based on the movement between the image and the second image.

2. The device of claim 1 the processor executes instructions further to:
   identify a second computing device comprising the camera and receiving the live feed;
   retrieve a second reference diagram of the second computing device; and
   overlay a second icon on a display attached to the second computing device in the live feed, wherein the second icon corresponds to an antenna location.

3. The device of claim 2, the processor executes instructions further to:
   receive a third image of the live feed of the camera;
   receive a movement of the second computing device;
   update the overlay of the first and second icons based on the movement;
   overlay the first and second icons on the live feed;
   compare a first position of the first icon and a second position of the second icon within the image;
   responsive to the comparison, initiate a wireless data transfer between the first and second computing devices when a distance between the first and second positions meets a threshold distance.

4. The computing device of claim 2, where the processor executes instructions further to:
   display the live feed with the overlayed first icon and the overlayed second icon.

5. The device of claim 3, wherein the first and second icons are scaled larger upon a proximity between the first and second computing devices becomes smaller.

6. The device of claim 3, the processor executes instructions further to:
   calculate a difference of location from the first icon to the second icon;
   overlay a third icon corresponding to a direction of movement to overlay the second icon to the first icon.

7. A method comprising:
   receiving an image of a live feed of a camera;
   identifying a first computing device in the image;
   retrieving a first reference diagram of the first computing device;
   overlaying a first icon over a first portion of the first computing device in the live feed corresponding to a first location in the first reference diagram, wherein the first location corresponds to a near-field communication (NFC) antenna location within the first computing device;

receiving a second image, wherein the second image sequentially follows the image in the live feed;

calculating a movement based on a difference between the image and the second image; and overlaying the first icon over the first portion of the first computing device in the live feed wherein the first portion corresponds to a second location based on the movement between the image and the second image.

8. The method of claim 7 wherein the movement corresponds to an increase of scale of the first computing device from the image to the second image.

9. The method of claim 8, the calculating further comprising:

scaling the first icon proportionally to the increase of scale of the first computing device.

10. The method of claim 9, wherein the first reference diagram comprises the first location of the near-field communication antenna.

11. The method of claim 10, wherein the first reference diagram corresponds to an object model of the first computing device stored in a database.

12. The method of claim 7, wherein the first computing device is identified in the image using object detection of a convolutional neural network (CNN).

13. A non-transitory computer readable medium comprising machine readable instructions that when executed cause a processor to:

receive an image of a live feed from a digital imaging component;

identify a first computing device in the image;

retrieve a first reference diagram of the first computing device from a database;

extract a first location from the first reference diagram;

overlay a first icon over a first portion of the first computing device in the live feed corresponding to the first location, wherein the first portion corresponds to an area within the first computing device where a near-field communication antenna (NFC) is integrated;

receive a second image, wherein the second image sequentially follows the image in the live feed;

calculate a movement based on a difference between the image and the second image; and overlay the first icon over the first portion of the first computing device in the live feed wherein the first portion corresponds to a second location based on the movement between the image and the second image.

14. The medium of claim 13, further comprising instructions to:

identify a second computing device receiving the live feed;

retrieve a second reference diagram of the second computing device;

overlay a second icon on a display attached to the second computing device, wherein the second icon corresponds to a location of an antenna within the second computing device; and overlay a third icon corresponding to a directional indicator from the second icon to the first icon.

15. The medium of claim 14, wherein the antenna within the second computing device comprises a second NFC antenna.

16. The medium of claim 14 wherein the second computing device comprises a handheld mobile device.

17. The computing device of claim 1, wherein the first reference diagram is a computer aided design file including a plurality of locations of internal components within the first computing device.

* * * * *